United States Patent [19]
Wakayama et al.

[11] Patent Number: 5,977,222
[45] Date of Patent: Nov. 2, 1999

[54] CHLOROPRENE RUBBER LATEX FOR ADHESIVE, PROCESS OF PRODUCTION THEREOF, AND ADHESIVE COMPOSITION USING THE SAME

[75] Inventors: Hisamasa Wakayama, Shinnanyo; Tadashi Hayashi, Tokuyama; Yukihiko Harada, Shinnanyo, all of Japan

[73] Assignee: Tosoh Corporation, Shinnanyo, Japan

[21] Appl. No.: 08/680,357

[22] Filed: Jul. 15, 1996

[30] Foreign Application Priority Data

Jul. 18, 1995 [JP] Japan .................................. 7-181441

[51] Int. Cl.$^6$ ........................................................ C08J 5/42
[52] U.S. Cl. ........................ 524/162; 524/552; 524/736; 524/741
[58] Field of Search .................................. 524/552, 736, 524/741, 162

[56] References Cited

U.S. PATENT DOCUMENTS

3,759,886  9/1973  Turner et al. ........................ 260/92.3

FOREIGN PATENT DOCUMENTS

| 0 451 998 | 10/1991 | European Pat. Off. . |
| 52-13983 | 4/1977 | Japan . |
| 59-38245 | 9/1984 | Japan . |
| 61-12710 | 1/1986 | Japan . |
| 62-257918 | 11/1987 | Japan . |
| 7-90031 | 4/1995 | Japan . |

*Primary Examiner*—Peter D. Mulcahy
*Attorney, Agent, or Firm*—Oblon, Spivak, McClelland, Maier & Neustadt, P.C.

[57] ABSTRACT

A chloroprene rubber latex for an adhesive containing a chloroprene rubber polymer which forms a copolymer with a chloroprene monomer and carboxyl-group containing vinyl monomer and which, when dissolved in chloroform to a concentration of 10% by weight, provides a solution free from organic solvent insolubles and having a solution viscosity of 100 mpa·s to 6000 mpa·s, a process for production thereof, and an adhesive composition using the same.

9 Claims, 1 Drawing Sheet

CHLOROPRENE RUBBER LATEX FOR ADHESIVE, PROCESS OF PRODUCTION THEREOF, AND ADHESIVE COMPOSITION USING THE SAME

BACKGROUND OF THE INVENTION

1. Field of the Invention

The present invention relates to chloroprene rubber latex for an adhesive containing, as an ingredient, a chloroprene rubber polymer. More specifically, it relates to a chloroprene rubber latex for an adhesive containing a polymer which, when dissolved in chloroform to a concentration of 10% by weight, provides a solution which does not contain organic solvent insolubles and which has a solution viscosity of 100 mpa·s to 6000 mpa·s, having an excellent room temperature bonding strength, high temperature bonding strength, water resistance, and other bonding properties and latex stability, and having these bonding properties balanced at a high level.

2. Description of the Related Art

Processes for the production of chloroprene rubber polymer latexes comprised of chloroprene and a carboxyl-group containing vinyl monomer such as acrylic acid or methacrylic acid are known from Japanese Unexamined Patent Publication (Kokai) No. 61-12710, Japanese Unexamined Patent Publication (Kokai) No. 62-257918, etc. Further, processes for production of latexes for adhesives using a water-soluble polymer such as a polyvinyl alcohol as an emulsifying and dispersing agent and adhesives using the same are known in Japanese Examined Patent Publication (Kokoku) No. 52-13983, Japanese Examined Patent Publication (Kokoku) No. 61-29968, etc.

However, there have been the following problems when using a chloroprene rubber latex produced by these processes.

(1) In the conventional latexes for adhesives, when increasing the molecular weight to improve the heat resistance, the tack retention (or adhesion retention) and room temperature bond strength were decreased and it was not possible to obtain physical properties sufficient for an adhesive. Further, attempts were made to improve the heat resistance by cross-linking the carboxyl-group containing vinyl monomer etc. with a metal oxide. However, it was not possible to achieve the physical properties expected due to the protective colloidal nature of the emulsifying agent used.

(2) When using an emulsifying agent having an excellent latex stability in the high pH region such as an alkaline metal salt of a rosin acid for the production, the rubber precipitates due to the slight changes in the pH when adding the tackifier, metal oxide, and other secondary components required for a chloroprene adhesive, and therefore, it is necessary to control the pH extremely carefully, which makes the procedure complicated. Further, when using a water-soluble polymer such as a polyvinyl alcohol for the production, a superior latex stability is exhibited due to the protective colloidal nature. However, since the polymer is water-soluble, the water resistance is remarkably degraded when used as an adhesive.

SUMMERY OF THE INVENTION

Accordingly, the objects of the present invention are to eliminate the above-mentioned problems and to provide a latex for an adhesive having an excellent room temperature bonding strength, high temperature bonding strength, water resistance, and other bonding properties which cannot be obtained with conventional latex type adhesives and having bonding properties balanced at a high level, and also to provide a process for production of the same, and an adhesive composition (or compound) using the same.

In accordance with the present invention, there is provided a chloroprene rubber latex for an adhesive comprising a chloroprene rubber latex containing a chloroprene rubber polymer which, when dissolved in chloroform to a concentration of 10% by weight, provides a solution free from organic solvent insolubles and having a solution viscosity of 100 mPa·s to 6000 mPa·s.

In accordance with the present invention, there is also provided a process for producing a chloroprene rubber latex for an adhesive mentioned above, comprising polymerizing 100 parts by weight of total monomers of 90 to 99.9 parts by weight of a chloroprene monomer and 0.1 to 10 parts by weight of a carboxyl-group containing vinyl monomer in the presence of 0.5 to 10 parts by weight of a water-soluble salt of alkyldiphenyl ether disulfonic acid and 0.1 to 3.0 parts by weight of n-dodecylmercaptan at 0° C. to 80° C., until a conversion of the monomers becomes 60 to 100%.

In accordance with the present invention, there is further provided an adhesive composition (or compound) comprising 100 parts by weight of the above-mentioned chloroprene rubber latex for an adhesive, 10 to 80 parts by weight of a tackifier and 1 to 5 parts by weight of a metal oxide or metal hydroxide.

BRIEF DESCRIPTION OF THE DRAWINGS

The present invention will be better understood from the description set forth below with reference to the accompanying drawings, wherein.

DESCRIPTION OF THE PREFERRED EMBODIMENTS

Figure 1:
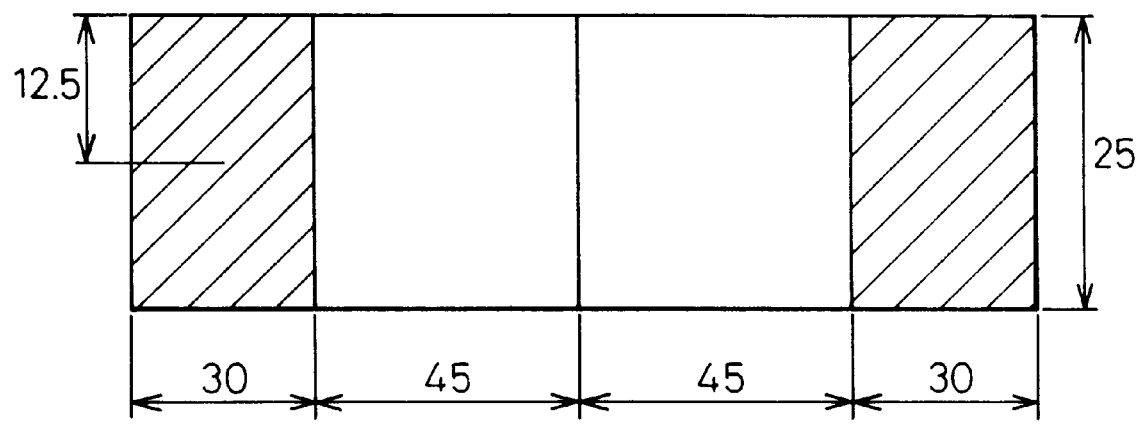
FIG. 1 is a view of a test piece of SBR used for the high temperature creep resistance test.

The present inventors engaged in intensive studies to solve the above-mentioned problem and, as a result, found that it was useful for the chloroprene rubber latex to contain a chloroprene rubber polymer which, when dissolved in chloroform to a concentration of 10% by weight, provides a solution which does not contain any organic solvent insolubles and has a solution viscosity of 100 mPa·s to 6000 mPa·s and for the chloroprene rubber polymer to particularly be a copolymer of a chloroprene monomer and carboxyl-group containing vinyl monomer.

Further, we found that the use of chloroprene rubber latex for an adhesive comprised of a mixture of two or more types of latexes containing polymers which, when dissolved in chloroform to a concentration of 10% by weight, provides solutions with different solution viscosities results in an adhesive composition (or compound) which exhibits excellent bonding properties depending upon the specific use thereof.

In particular, we found that, when using a sodium alkyl diphenyl ether disulfonate, as the emulsifying and dispersing agent, a latex containing a copolymer which, when dissolved in chloroform to a concentration of 10% by weight, provides a solution free from any organic solvent insolubles and having a solution viscosity of 100 to 6000 mPa·s is stable in the face of chemical changes such as fluctuations in the pH and in application where a physical weight is applied in bonding work such as spray coating or roll coater coating, whereby the present invention was completed.

The present invention will be explained in detail below:

The chloroprene rubber latex in the present invention is comprised of a chloroprene rubber latex for an adhesive containing a chloroprene rubber polymer which, when dissolved in chloroform to a concentration of 10% by weight, provides a solution free from organic solvent insolubles and having a solution viscosity of 100 mPa·s to 6000 mPa·s.

When the solution viscosity is less than 100 mPa·s, the heat resistance is insufficient, while when the solution viscosity is more than 6000 mPa·s, the bond with other materials becomes poor. In both cases, a sufficient bond strength is not obtained and the results are not suitable for an adhesive-use latex.

Note that this solution viscosity preferably is 200 mPa·s to 3000 mPa·s since the bonding properties and the latex stability thus obtained can be balanced at a high level.

The solution of a concentration of 10% by weight referred to herein is, for example, a solution obtained by freeze-drying the polymer in the latex and dissolving 20 g thereof in 180 g of chloroform.

The solution viscosity used herein means a solution viscosity obtained by adjusting the solution to 23° C. in a thermostatic chamber and measuring the viscosity by a B-type viscometer using a No. 3 rotor at 12 rpm for 60 seconds.

The chloroprene rubber latex according to the present invention may be alone or any mixtures thereof. Among these, a mixture of a chloroprene rubber latex containing a chloroprene rubber polymer which provides a solution, when dissolved in chloroform to a concentration of 10% by weight and which does not contain any organic solvent insolubles and which has a solution viscosity of not less than 500 mPa·s and a chloroprene rubber latex containing a chloroprene rubber polymer which provides a solution, when dissolved in chloroform to a concentration of 10% by weight, which does not contain any organic solvent insolubles and which has a solution viscosity of less than 500 mPa·s, which mixture has a solution viscosity of 100 mPa·s to 6000 mPa·s in view of the balance between the bonding properties and latex stability, is preferable.

Note that the chloroprene rubber latex containing a chloroprene rubber polymer which, when dissolved in chloroform to a concentration of 10% by weight, provides a solution which does not include organic solvent insolubles and which has a solution viscosity of at least 500 mPa·s, further preferably has a viscosity of 500 mPa·s to 6000 mPa·s, to maintain the adhesiveness.

The proportion of the chloroprene rubber latex to be mixed is not particularly limited so long as it is in the range enabling high bonding properties to be maintained with the good balance. For example, however, mixing a chloroprene rubber latex containing a chloroprene rubber polymer which, when dissolved in chloroform to a concentration of 10% by weight, provides a solution which does not contain any organic solvent insolubles and which has a solution viscosity of not less than 500 mPa·s and a chloroprene rubber latex containing a chloroprene rubber polymer which provides a solution, when dissolved in chloroform to a concentration of 10% by weight, which does not contain any organic solvent insolubles and which has a solution viscosity of less than 500 mPa·s to give a ratio by weight of 90:10 to 10:90 is preferable in terms of obtaining a chloroprene rubber latex for an adhesive having a balance of excellent high temperature bonding strength and room temperature bonding strength. The solution viscosity of this mixture is 100 mPa·s to 6000 mPa·s.

Further, the chloroprene rubber polymer contained in the latex is preferably a copolymer of a chloroprene monomer and a carboxyl-group containing vinyl monomer due to the superiority of the adhesiveness.

The method for polymerization of the latex of the present invention is not particularly limited. It is sufficient to perform radical emulsion polymerization with a carboxyl-group containing vinyl monomer etc. copolymerizable with a chloroprene monomer or other copolymerizable ethylenic unsaturated monomers. The emulsion polymerization may be performed using a known method by emulsifying water, the monomers, an emulsifying and dispersing agent, polymerization initiator, chain transfer agent, etc. and performing the polymerization at a predetermined temperature (e.g., 0–80° C.). The ingredients may each be added all at once, added successively, or added in batches.

In particular, a copolymer of a chloroprene rubber and a carboxyl-group containing vinyl monomer is superior in high temperature bonding strength and excellent in bonding with various materials, and therefore, is particularly suitable. As a copolymerizable carboxyl-group containing vinyl monomer, an unsaturated fatty acid such as acrylic acid, methacrylic acid, fumaric acid, maleic acid, crotonic acid, etc. may be exemplified. Preferably, for example, 0.1 to 10 parts by weight of the carboxyl-group containing vinyl monomer based upon 90 to 99.9 parts by weight of the chloroprene monomer to give a total weight of the monomers of 100 parts by weight. When 0.1 to 10 parts by weight of the carboxyl-group containing vinyl monomer is used, a high temperature bonding strength and latex stability can be obtained due to the cross-linking with the metal oxide.

Further, if desired, as a copolymerizable ethylenic unsaturated monomer, for example, monomers usually used for copolymerization with chloroprene such as ethylene, methyl methacrylate, acrylonitrile, 2,3-dichlorobutadiene, and 1-chlorobutadiene may be used in an amount of 20 parts by weight or less.

The emulsifying and dispersing agent usable in the polymerization according to the present invention is not particularly limited, but, for example, a carboxylic acid based, sulfonic acid based, or sulfuric acid ester based anionic emulsifier or nonionic emulsifier, for example, alkaline metal salts of disproportionated rosin acids, alkylsulfonates having 8 to 20 carbon atoms, alkylaryl sulfate, sodium naphthaline sulfate and formaldehyde condensates, alkaline metal salts of polyoxyethylene nonyl alkyl ether sulfonic acid, polyoxyethylene alkyl ethers, polyoxyethylene alkyl phenols, sorbitan fatty acid esters, polyoxyethylene acyl esters, etc. may be exemplified.

In particular, in the case of a copolymer of a chloroprene monomer and carboxyl-group containing vinyl monomer, alkaline metal salts and triethanolamine salts of alkyl diphenyl ether disulfonic acids, alkaline metal salts and triethanolamine salts of dodecylbenzenesulfonic acid, alkaline metal salts and triethanolamine salts of laurosulfuric acid, alkaline metal salts of polyoxyethylene alkyl ether sulfonic acids, and alkaline metal salts of polyoxyethylene alkyl phenyl ether sulfonic acids, etc. may be used in an emulsion polymerization under acidic conditions. Among these, due to the excellent state of emulsification and stability during polymerization, sodium alkyldiphenyl ether disulfonate is preferred.

The method of using these emulsifying and dispersing agents is not particularly limited. They may be used alone or in any combination thereof.

Further, as to the timing for adding the emulsifying and dispersing agent, there are the method of adding it all at once when filling the materials for the polymerization or adding it during the polymerization and the method of adding it at the end of the polymerization. While not particularly limited, to impart a better stability, it is preferable to add the agent during the polymerization at the point of time when the conversion reaches 50 to 90%.

The amount of the agent added is preferably 0.5 to 10 parts by weight based upon 100 parts by weight of the total of the chloroprene monomer and the carboxyl-group containing vinyl monomer in terms of maintaining the stability. A 3 to 8 parts by weight amount, further, results in a better compounding stability and water resistance at the time of preparing the adhesive.

As the polymerization initiator, any known free radical-forming substances, for example, persulfates such as potassium persulfate and ammonium persulfate, inorganic or organic peroxides such as hydrogen peroxide and t-butylhydroperoxide, etc. Further, these may be used alone or in joint redox systems with reducing substances such as hydrosulfite, thiosulfate, thiosulfite, organic amines, etc. may be used.

As the polymerization temperature, while not particularly limited, the polymerization may be performed in the range of 0 to 80° C., preferably the range of 10 to 50° C.

The timing for terminating the polymerization is not particularly limited, but the polymerization is preferably performed until a conversion of the monomers of 60 to 100%. The polymerization conversion of 95 to 100% is even more preferable.

As the chain transfer agent, alkyl mercaptan, halogenated hydrocarbons, alkyl xantogen disulfide, and sulfur and other molecular weight adjusters may be used, for example. Among these, bromine and, from the viewpoint of work efficiency, n-dodecylmercaptan are preferred. The amount used is preferably 0.1 to 3 parts by weight, more preferably 0.3 to 1 part by weight, per 100 parts by weight of the total of the chloroprene monomer and carboxyl-group containing vinyl monomer.

The polymerization terminator is not particularly limited so long as it is usually used. For example, phenothiazine, 2,6-t-butyl-4-methylphenol, hydroxyamine, etc. may be used. The amount used is sufficiently 0.05 part by weight based upon 100 parts by weight of the total of the chloroprene monomer and carboxyl-group containing vinyl monomer. The time of addition should be when the predetermined conversion rate has been reached. The polymerization conversion is preferably 95 to 100%. When there is residual monomer, the monomer should be removed.

The latex for an adhesive obtained according to the present invention can be used as an adhesive per se, but the addition of a tackifier and a metal oxide (or hydroxide) is preferable, because the bond properties are improved.

The tackifier in the present invention is not particularly limited. There are phenolic resins, terpenic resins, rosin derivative resins, oil-based hydrocarbons, etc. For example, hydrogenated rosins, pentaerythritol esters of hydrogenated rosins, polymerized rosins, rosin modified resins primarily comprised of rosins, alkyl phenol resins, rosin-modified phenolic resins, terpene-modified phenolic resins, natural terpenic resins, etc. may be used.

These resins can be used in an amount of 10 to 80 parts by weight, preferably 20 to 60 parts by weight, per 100 parts by weight of the chloroprene rubber latex. Within this range, a sufficient adhesiveness can be obtained and the adhesive performance can be greatly improved. As the method of addition, it is possible to add them dissolved in advance in an organic solvent, but they are preferably added in the form of an emulsified and dispersed emulsion.

The metal oxides or hydroxides usable in the present invention is oxides or hydroxides of metal cations of Group II and Group III such as magnesium oxide and hydroxide, calcium oxide and hydroxide, and zinc oxide and hydroxide. These metal oxides and hydroxides are preferably used in amounts of 1 to 5 parts by weight per 100 parts by weight of the chloroprene rubber latex. Within this range, a sufficient adhesiveness can be obtained and the adhesive performance can be greatly improved. As the method of addition, the method of adding the oxide etc. in the form of an emulsified and dispersed emulsion is preferred.

The configuration of the chloroprene rubber latex for an adhesive according to the present invention, process of production, and adhesive composition using the same are as explained above and gave a room temperature strength, high temperature bonding strength, water resistance, and other bonding properties and latex stability of an excellence not obtained by conventional latex adhesives and further gave these bonding properties balanced at a high level.

EXAMPLES

The present invention will now be explained in detail by, but is not limited to, the following Examples.

The room temperature peel strength, high temperature peel strength, high temperature creep resistance test, water resistance, latex stability (i.e., compounding stability and mechanical stability) were measured and evaluated by the following methods:

Room Temperature Peel Strength

An SBR rubber sheet (made by Showa Rubber, 150 mm×25 mm) with a surface polished by a No. 60 polishing cloth and a No. 9 cotton sailcloth (150 mm×25 mm) were each coated by a brush with an adhesive-use composition on one side in an amount of about 450 g/m$^2$ (wet), then were heated and dried at 60° C. for 10 minutes and pressed together using a hand roller. This was aged at 23° C. in a thermostatic chamber for 3 days to prepare a test piece. The test piece was measured for its 180° peel strength using a Tensilon tensile tester under conditions of 23° C. and a tensile rate of 200 mm/min.

High Peel Strength

The 180° peel strength was measured using a test piece prepared in the same way as in the measurement of the room temperature strength under conditions of 80° C. and a tensile rate of 200 mm/min using a Tensilon tensile tester.

High Creep Resistance Test

Figure 2:
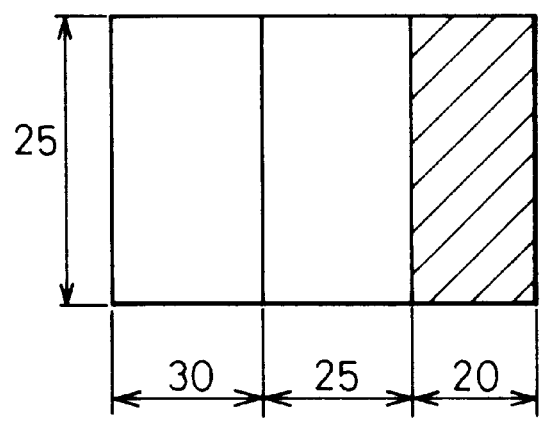
FIG. 2 is a view of a test piece of SBR used for a high temperature creep resistance test.

One surface of SBR (made by Showa Rubber, 150×25 mm) polished on its surface by a No. 60 polishing cloth was coated with an adhesive composition by a brush to an amount of about 450 g/m$^2$, then was heated and dried at 60° C. for 10 minutes. As shown in FIG. 1, the hatched portion was covered by a polyethylene sheet and was bent at the center. As shown in FIG. 2, the hatched portion was cut away and a hand roller was used to press the two together so as to give a bonded portion of 25×25 mm. This was aged in a thermostatic chamber at 23° C. for 3 days to prepare a test piece. As with the 180° peeling, one end of the test piece was hung inside the thermostatic chamber and a 200 g weight was attached to the other end in a manner not giving any shock. The temperature in the thermostatic chamber was maintained at 80° C. The time was measured in terms of "minutes" when the adhesive softened and the load of the weight could no longer be withstood and the weight fell.

This was used as the high temperature creep resistance. Sixty minutes was used as the final time. When not falling, "over 60 minutes" was indicated. Further, when not falling, but slipping, the length (mm) of the slip after 60 minutes was measured.

Water Resistance

The 180° peel strength was measured by immersing a test piece prepared in the same way as in the measurement of the room temperature peel strength in pure water of 23° C. for 3 days, then immediately wiping off the excess moisture and performing the measurement under conditions of 23° C. and a tensile rate of 200 mm/min using a Tensilon tensile tester.

Latex Stability

Compounding Stability

The presence or absence of rubber precipitate due to the compounding in the adhesive-use latex was observed.

Mechanical Stability

The mechanical stability of the adhesive composition was measured by the rubber coagulation rate ((weight of coagulated rubber after drying/weight of solids in sample)×100) using the Marron test method (Japan Rubber Association Standard Specification 3203-1983, JIS K 6387).

Example 1

The chloroprene of the composition and proportions shown in Table 1, methacrylic acid, n-dodecylmercaptan, sodium alkyl diphenyl ether sulfonate (Pellex SSH, made by Kao Corporation), a condensate of sodium naphthaline sulfonate and formaldehyde (Demol N, made by Kao Corporation), sodium hydrosulfite, triethanol amine, and water were polymerized in a 10 liter autoclave equipped with an agitator at 40° C. to obtain the copolymer latex B. The properties of the obtained latex are shown in Table 1 as well.

TABLE 1

| Latex | A | B | C | D | E |
|---|---|---|---|---|---|
| Chloroprene | 98.5 | 98.5 | 98.5 | 98.5 | 98.5 |
| Methacrylic acid | 1.5 | 1.5 | 1.5 | 1.5 | 1.5 |
| n-dodecylmercaptan | 0.9 | 0.7 | 0.4 | 0.2 | 2.0 |
| DPDS[1] | 6 | 6 | 6 | 6 | 6 |
| FNS[2] | 0.7 | 0.7 | 0.7 | 0.7 | 0.7 |
| Triethanolamine | 0.2 | 0.2 | 0.2 | 0.2 | 0.2 |
| Reducing agent[3] | 0.01 | 0.01 | 0.01 | 0.01 | 0.01 |
| Pure water | 85 | 85 | 85 | 85 | 85 |
| Chloroform insolubles[4] (%) | 0 | 0 | 0 | 10 | 0 |
| 10% solution viscosity[5] (%) | 230 | 2390 | 5840 | 9870 | 80 |

Values are in parts by weight.

Polymerization temperature: 40° C., polymerization addition rate: 98% or more

1) Sodium alkyldiphenylether disulfonate

2) Condensation product of sodium naphthalene sulfonate and formaldehyde

3) Sodium hydrosulfide

4) Chloroform insolubles (%)=(Wo/Wi)×100

A sample of the latex was flow-cast to form a film, the weight (Wi (g)) of the sample was measured, and the sample was placed in a measuring flask along with chloroform and kept immersed at 23° C. one day and night. Next, a 200 mesh metal sieve was used to filter the sample, washing was performed with chloroform, then the remainder was dried at 110° C. and the weight (Wo (g)) was measured.

5) A solution viscosity (mPa·s) of chloroform soluble at a concentration of 10% by weight in chloroform.

A type B viscometer was used (No. 3 rotor, 12 rpm, 23° C., 60 sec)

The polymerization was performed by continuously dropping a 0.35% aqueous solution of potassium persulfate in a nitrogen atmosphere. The conversion was over about 98%. As the terminator, 2,6-t-butyl-4-methylphenol was added in an amount of 0.05 part by weight per 100 parts by weight of the total of the chloroprene monomer and the carboxyl-group containing vinyl monomer so as to terminate the polymerization. The copolymer latex thus obtained was blended with the tackifier and metal oxide in the composition and proportions shown in Table 2 to obtain an adhesive composition.

TABLE 2

| | Ex. 1 | Ex. 2 | Ex. 3 | Ex. 4 | Ex. 5 | Ex. 6 | Ex. 7 | Ex. 8 | Comp. Ex. 1 | Comp. Ex. 2 | Comp. Ex. 3 | Comp. Ex. 4 |
|---|---|---|---|---|---|---|---|---|---|---|---|---|
| Latex | | | | | | | | | | | | |
| A | — | — | 10 | 50 | 90 | 100 | — | — | — | — | — | — |
| B | 100 | — | — | — | — | — | 100 | — | — | — | — | — |
| C | — | 100 | 90 | 50 | 10 | — | — | 100 | — | — | — | — |
| D | — | — | — | — | — | — | — | — | 100 | — | — | — |
| E | — | — | — | — | — | — | — | — | — | 100 | — | — |
| Commercially available latex X[1] | — | — | — | — | — | — | — | — | — | — | 100 | — |

TABLE 2-continued

|  | Ex. 1 | Ex. 2 | Ex. 3 | Ex. 4 | Ex. 5 | Ex. 6 | Ex. 7 | Ex. 8 | Comp. Ex. 1 | Comp. Ex. 2 | Comp. Ex. 3 | Comp. Ex. 4 |
|---|---|---|---|---|---|---|---|---|---|---|---|---|
| Commercially available latex Y[2] | — | — | — | — | — | — | — | — | — | — | — | 100 |
| Chloroform insolubles[3] | 0 | 0 | 0 | 0 | 0 | 0 | 0 | 0 | 10 | 0 | 60 | 60 |
| Solution viscosity[4] | 2390 | 5840 | 4820 | 3050 | 560 | 230 | 2390 | 3850 | 9870 | 80 | 3800 | 3400 |
| Terpene phenol resin emulsion[5] | 15 | 15 | 15 | 15 | 15 | 15 | 15 | 25 | 15 | 15 | 15 | 15 |
| Resin ester resin[6] emulsion | 15 | 15 | 15 | 15 | 15 | 15 | 15 | 25 | 15 | 15 | 15 | 15 |
| Zinc white emulsion[7] | 3 | 3 | 3 | 3 | 3 | 5 | 5 | 3 | 3 | 3 | 5 | 5 |

Values are parts by weight
[1]Commercially available latex X: Rosin salt used as emulsifying and dispersing agents.
[2]Commercially available latex Y: Polyvinyl alcohol used as emulsification and dispersion agent.
[3]Chloroform insolubles (%) = (Wo/Wi) × 100
A sample of the latex was flow-cast to form a film, the weight (Wi (g)) of the sample was measured, and the sample was placed in a measuring flask along with chloroform and kept immersed at 23° C. one day and night. Next, a 200 mesh metal sieve was used to filter the sample, washing was performed with chloroform, then the remainder was dried at 110° C. and the weight (Wo (g)) was measured.
[4]A solution viscosity (mPa · s) chloroform soluble at a concentration of 10% by weight in chloroform.
A type B viscosity meter was used (No. 3 rotor, 12 rpm, 23° C., 60 sec)
[5]Tamal E-100 (made by Arakawa Kagaku Kogyo Co., Ltd.)
[6]Superester E-650 (made by Arakawa Kagaku Kogyo Co., Ltd.)
[7]AZ-SW (made by Osaki Kogyo Co., Ltd.)

The results of the evaluation of the room temperature peel strength, high temperature peel strength, high temperature creep resistance, water resistance, compounding stability, and mechanical stability are shown in Table 3.

portions shown in Table 1 were mixed in a proportion of 10:90 and the physical properties of the resultant adhesive were evaluated in accordance with Example 1. Table 2 shows the composition and proportion of the adhesive

TABLE 3

|  | Ex. 1 | Ex. 2 | Ex. 3 | Ex. 4 | Ex. 5 | Ex. 6 | Ex. 7 | Ex. 8 | Comp. Ex. 1 | Comp. Ex. 2 | Comp. Ex. 3 | Comp. Ex. 4 |
|---|---|---|---|---|---|---|---|---|---|---|---|---|
| Compound stability[1] | ○ | ○ | ○ | ○ | ○ | ○ | ○ | ○ | ○ | ○ | X | ○ |
| Mechanical stability[2] (%) | 0.030 | 0.010 | 0.015 | 0.015 | 0.020 | 0.010 | 0.015 | 0.020 | 0.010 | 0.020 | 3.52 | 0.009 |
| Room temperature peel strength (N/25 mm) | 80 | 70 | 70 | 75 | 85 | 80 | 80 | 70 | 40 | 60 | 70 | 70 |
| Water resistance (N/25 mm) | 40 | 33 | 32 | 30 | 40 | 30 | 35 | 32 | 15 | 30 | 20 | 10 |
| High temperature peel strength (N/25 mm) | 22 | 35 | 25 | 23 | 20 | 15 | 20 | 25 | 15 | 5 | 20 | 10 |
| High temperature creep resistance (minutes) (mm) | 30 25 | 50 25 | 45 25 | 40 25 | 35 25 | 20 25 | 35 25 | 50 25 | >60 4 | 4 25 | 10 4 | 20 25 |

[1]○: No precipitation of rubber observed. X: Precipitation of rubber observed.
[2]Rubber coagulation rate (%): (Weight of coagulated rubber after drying/Weight of solid in sample) × 100

From the results of Table 3, it is clear that the room temperature peel strength and water resistance are excellent and the high temperature peel strength and high temperature creep resistance, which are related to the heat resistance, are obtained balanced at a high level and are excellent.

Example 2

The physical properties of the adhesive were evaluated in accordance with Example 1, except for changing to a copolymer latex C obtained by the process in accordance with Example 1 using the composition and proportions shown in Table 1. Table 2 shows the composition and proportion of the adhesive composition. As shown by the results of evaluation in Table 3, it was found that the room temperature peel strength, high temperature peel strength, high temperature creep resistance, and water resistance were all excellent.

Example 3

The copolymer latexes A and C obtained by the process in accordance with Example 1 in the compositions and procomposition. As shown by the results of evaluation in Table 3, it was found that the room temperature peel strength, high temperature peel strength, high temperature creep resistance, and water resistance were all excellent.

Example 4

The copolymer latexes A and C obtained by the process in accordance with Example 1 in the compositions and proportions shown in Table 1 were mixed in a proportion of 50:50 and the physical properties of the resultant adhesive were evaluated in accordance with Example 1. Table 2 shows the composition and proportion of the adhesive composition. As shown by the results of evaluation in Table 3, it was found that the room temperature peel strength, high temperature peel strength, high temperature creep resistance, and water resistance were all excellent.

Example 5

The copolymer latexes A and C obtained by the process in accordance with Example 1 in the compositions and proportions shown in Table 1 were mixed in a proportion of 90:10 and the physical properties of the resultant adhesive were evaluated in accordance with Example 1. Table 2 shows the composition and proportions of the adhesive composition. As shown by the results of evaluation in Table 3, it was found that the room temperature peel strength, high temperature peel strength, high temperature creep resistance, and water resistance were all excellent.

Example 6

The physical properties of the adhesive were evaluated in accordance with Example 1, except for changing to a copolymer latex A obtained by the process in accordance with Example 1 using the composition and proportions shown in Table 1. Table 2 shows the composition and proportion of the adhesive composition. As shown by the results of evaluation in Table 3, it was found that the room temperature peel strength, water resistance, and the high temperature peel strength and high temperature creep resistance, related to the heat resistance, were obtained balanced at a high level and, further, the stability of the composition and mechanical stability were excellent.

Example 7

The physical properties of the adhesive were evaluated in accordance with Example 1, except for changing to a copolymer latex B obtained by the process in accordance with Example 1 using the composition and proportion shown in Table 1. Table 2 shows the composition and proportion of the adhesive composition. As shown by the results of evaluation in Table 3, it was found that the room temperature peel strength and water resistance were excellent and the high temperature peel strength and high temperature creep resistance, related to the heat resistance, were obtained balanced at a high level and, further, the stability of the composition and mechanical stability were excellent.

Example 8

The physical properties of the adhesive were evaluated in accordance with Example 1, except for changing to a copolymer latex C obtained by the process in accordance with Example 1 using the composition and proportions shown in Table 1. Table 2 shows the composition and proportion of the adhesive composition. As shown by the results of evaluation in Table 3, it was found that the room temperature peel strength, water resistance, and the high temperature peel strength and high temperature creep resistance, related to the heat resistance, were obtained balanced at a high level and, further, the stability of the composition and mechanical stability were excellent.

Comparative Example 1

The physical properties of the adhesive were evaluated in accordance with Example 1, except for changing to a copolymer latex D obtained by the process in accordance with Example 1 using the composition and proportion shown in Table 1. Table 2 shows the composition and proportions of the adhesive composition.

As shown by the results of evaluation in Table 3, the high temperature creep resistance was excellent, but the bonding to other objects was poor, and therefore, the room temperature peel strength and water resistance were inferior.

Comparative Example 2

The physical properties of the adhesive were evaluated in accordance with Example 1, except for changing to a copolymer latex E obtained by the process in accordance with Example 1 using the composition and proportion shown in Table 1. Table 2 shows the composition and proportions of the adhesive composition.

As shown by the results of evaluation in Table 3, the high temperature peel strength and high temperature creep resistance were inferior and sufficient bonding properties could not be maintained.

Comparative Example 3

The physical properties of the adhesive were evaluated in accordance with Example 1 except for changing to a commercially available latex A prepared using a rosin acid salt for the emulsifier and dispersant. The composition and proportion of the adhesive composition are shown in Table 2.

As shown by the results of evaluation in Table 3, the room temperature peel strength, high temperature peel strength, water resistance, and heat resistance are inferior and further the stability of the composition and mechanical stability are extremely inferior.

Comparative Example 4

The physical properties of the adhesive were evaluated in accordance with Example 1, except for changing to a commercially available latex B prepared using a rosin acid salt for the emulsifier and dispersant. Table 2 shows the composition and proportion of the adhesive composition.

As shown by the results of evaluation in Table 3, the stability of the composition and mechanical stability are excellent, but a satisfactory result could not be obtained for the water resistance.

The chloroprene rubber latex obtained according to the present invention is excellent in room temperature bonding power, high temperature bonding power, water resistance, and other bonding properties and latex stability to an extent never achieved in conventional latexes and has a balance of these bonding properties at a high level so is suitable as an adhesive for various applications such as wood, leather, fabric, rubber, plastics, and metal.

We claim:

1. A chloroprene rubber latex adhesive comprising a chloroprene rubber polymer and an aqueous medium, said chloroprene rubber polymer containing, as an emulsifying and dispersing agent for imparting latex stability, a water-soluble salt of an alkyldiphenyl ether disulfonic acid and providing a solution free from organic solvent insolubles and having a solution viscosity of 100 mPa·s to 6000 mPa·s, when dissolved in chloroform to a concentration of 10% by weight.

2. A chloroprene rubber latex adhesive as claimed in claim 1, comprising a mixture of (i) a chloroprene rubber latex containing a chloroprene rubber polymer which, when dissolved in chloroform to a concentration of 10% by weight, provides a solution free from organic solvent insolubles and has a solution viscosity of at least 500 mPa·s and (ii) a chloroprene rubber latex containing a chloroprene rubber polymer which, when dissolved in chloroform to a concentration of 10% by weight, provides a solution free from organic solvent insolubles and has a solution viscosity of less than 500 mPa·s.

3. A chloroprene rubber latex adhesive as claimed in claim 2, wherein the ratio by weight of (i):(ii) is 90:10 to 10:90.

4. A chloroprene rubber latex adhesive as claimed in claim 1, wherein the polymer contained in the chloroprene rubber latex is a copolymer of a chloroprene monomer and a carboxyl group-containing vinyl monomer.

5. A chloroprene rubber latex adhesive as claimed in claim 2, wherein the polymer contained in the chloroprene rubber latex is a copolymer of a chloroprene monomer and a carboxyl group-containing vinyl monomer.

6. A chloroprene rubber latex adhesive as claimed in claim 3, wherein the polymer contained in the chloroprene rubber latex is a copolymer of a chloroprene monomer and a carboxyl group-containing vinyl monomer.

7. A process for producing a chloroprene rubber latex for an adhesive according to claim 1, comprising polymerizing 100 parts by weight of total monomers of 90 to 99.9 parts by weight of a chloroprene monomer and 0.1 to 10 parts by weight of a carboxyl-group containing vinyl monomer in the presence of 0.5 to 10 parts by weight of a the water-soluble salt of alkyldiphenyl ether disulfonic acid and 0.1 to 3.0 parts by weight of n-dodecylmercaptan at 0° C. to 80° C., until a conversion of the monomers becomes 60 to 100%.

8. An adhesive composition comprising 100 parts by weight of a chloroprene rubber latex for an adhesive according to claim 1, 10 to 80 parts by weight of a tackifier and 1 to 5 parts by weight of a metal oxide or metal hydroxide.

9. An adhesive composition as claimed in claim 8, wherein the tackifier is at least one member selected from the group consisting of phenolic resins, terpenic resins, rosin-derived resins, and petroleum-based hydrocarbons.

* * * * *